United States Patent
Fischer et al.

(10) Patent No.: US 6,399,703 B1
(45) Date of Patent: Jun. 4, 2002

(54) METHOD FOR THE CONTINUOUS PRODUCTION OF THERMOPLASTIC MOLDING MATERIALS

(75) Inventors: Wolfgang Fischer, Walldorf; Eugen-Walter Büchner, Ludwigshafen; Axel Deimling, Neustadt; Hermann Gausepohl, Mutterstadt; Christian Schade, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/582,879

(22) PCT Filed: Jan. 26, 1999

(86) PCT No.: PCT/EP99/00469

§ 371 (c)(1),
(2), (4) Date: Jul. 6, 2000

(87) PCT Pub. No.: WO99/40136

PCT Pub. Date: Aug. 12, 1999

(30) Foreign Application Priority Data

Feb. 7, 1998 (DE) .......................... 198 04 912

(51) Int. Cl.[7] .............................. C08F 297/00
(52) U.S. Cl. ...................... 525/54; 525/88; 525/98; 525/314; 525/315; 525/316; 525/53; 528/501
(58) Field of Search .................. 525/54, 314, 316, 525/315, 88, 98, 53; 528/501

(56) References Cited

U.S. PATENT DOCUMENTS

| | | | |
|---|---|---|---|
| 3,660,535 A | * | 5/1972 | Finch et al. ............... 525/54 X |
| 3,957,914 A | | 5/1976 | Baumgartner |
| 4,153,647 A | | 5/1979 | Glukhovskoi |
| 5,227,431 A | | 7/1993 | Lawson et al. |
| 5,286,457 A | | 2/1994 | Woodson et al. |
| 5,891,947 A | | 4/1999 | Hall et al. |
| 5,990,236 A | * | 11/1999 | Knoll et al. ............... 525/54 X |

FOREIGN PATENT DOCUMENTS

| | | |
|---|---|---|
| CA | 2088012 | 8/1993 |
| CA | 1336032 | 6/1995 |
| DE | 196 48245 | 5/1998 |
| DE | 197 01865 | 7/1998 |
| EP | 059 231 | 9/1982 |
| EP | 334 715 | 9/1989 |
| EP | 510 410 | 10/1992 |
| EP | 554 142 | 8/1993 |
| EP | 595 121 | 5/1994 |
| EP | 648 790 | 4/1995 |
| GB | 1013205 | 12/1965 |
| WO | 96/25442 | 8/1996 |

OTHER PUBLICATIONS

Chem.Eng.Techno. 13 (1990) 214–220, Tien et al.

* cited by examiner

Primary Examiner—Fred Teskin
(74) Attorney, Agent, or Firm—Keil & Weinkauf

(57) ABSTRACT

A process for preparing impact-modified styrene polymers (HIPS) omprises anionic polymerization of styrene in the presence of a rubber in one or more polymerization reactors in succession. The rubber is prepared in solution in an immediately upstream process. The heat of polymerization is utilized to remove the solvent for the rubber, this solvent having a boiling point lower than those of styrene and ethylbenzene, from at least one of the polymerization reactors via distillation with distillative cooling, and the solvent is reintroduced into the process of rubber preparation.

15 Claims, 1 Drawing Sheet

METHOD FOR THE CONTINUOUS PRODUCTION OF THERMOPLASTIC MOLDING MATERIALS

The invention relates to a process which can be carried out continuously for preparing impact-modified styrene polymers (HIPS) which comprise, as disperse phase in a polystyrene matrix, a styrene-butadiene block copolymer or a particulate polybutadiene rubber compatibilized by grafting with styrene, by anionic polymerization of styrene in a polymerization reactor, or in more than one polymerization reactor arranged in sequence, in the presence of a rubber prepared in an immediately prior process, and preferably in the presence of a subordinate amount of an alkylaromatic solvent other than styrene, in particular toluene, ethylbenzene or mixtures of toluene and ethylbenzene.

Impact-modified polystyrene is usually prepared by bulk free-radical polymerization, where the rubber, obtained in a separate process, is dissolved in the styrene. In addition, use is usually made of a small amount of a solvent, such as ethylbenzene. The polymerization is carried out industrially in more than one reactor arranged in sequence, known as a cascade. Processes of this type have been reviewed, for example, by Echte in Handbuch der Technischen Polymerchemie, Weinheim, 1993; specific arrangements are described, for example, in U.S. Pat. Nos. 2,727,884 and 3,903,202.

It has also been proposed that impact-modified polystyrene may be prepared by anionic polymerization. This could be done, for example, in tubular reactors, the heat of polymerization being dissipated through the wall. To this end static mixers are incorporated in the cross-section of the tube, and encourage thorough radial mixing of the polymer (Nguyen Khac Tien et al. Chem. Eng. Technol. 13, 214–220 1990). However, no process of this type has become well established.

Rubbers, such as polybutadiene, are usually prepared in solution. Reference may be made in this connection to the review in Encyclopedia of Polymer Science and Technology Vol. 2, N.Y., 1985.

Anionic polymerization, as used for preparing block rubbers (styrene-butadiene block copolymers), for example, always requires a solvent (EP-A-510 410; EP-A-554 142; U.S. Pat. No. 5,286,457).

The disadvantage of known processes for preparing impact-modified polystyrene is that if a rubber is to be used for impact-modification it has firstly to be isolated from its reaction mixture (i.e. from a solution whose strength is, for technical reasons, at most from 15 to 20%).

Attempts have already been made to find industrially useful processes which dispense with the costly isolation of the rubber.

For example, European Patent Application 334 715 proposes a process for free-radical-initiated styrene polymerization in which polybutadiene is firstly prepared by anionic polymerization in ethylbenzene in a stirred reactor. Following termination of the reaction, preheated styrene is to be added as diluent, followed by polymerization. However, even this process would not be cost-effective in operation because of the amount of (high-boiling) solvent which is necessary for preparing the rubber and which has to amount to from 40 to 100% by weight of the amount of styrene subsequently added.

The British Patent 1 013 205 therefore proposes that butadiene is initially polymerized in a relatively low-boiling solvent, specifically cyclohexane, and that the solution is mixed with styrene and fractionated by distilling off the cyclohexane together with any remaining butadiene monomer. The solution of the rubber in styrene thus obtained is then to be used in the manner which is usual in styrene polymerization. This per se elegant process has not been introduced industrially, probably because, as indicated in the British Patent, the cyclohexane would have to be removed in an additional step to allow the polymerization to be carried out with an adequately high concentration of monomer.

These considerations also apply of course to anionic polymerization processes for preparing impact-modified polystyrene. On the other hand, in continuous anionic polymerizations it would scarcely be possible to use a rubber which had been isolated from its solution, because of the auxiliaries added during isolation. This is probably one of the reasons that the preparation of impact-modified polystyrene by anionic polymerization has not been introduced on an industrial scale, although it has the advantage per se of giving virtually monomer-free polystyrene.

European Patent 059 231 clearly describes the disadvantages of the process of the British Patent 1 013 205. A process is then proposed in which styrene and butadiene are initially processed anionically in a stirred reactor, i.e. with back-mixing, to give a styrene-butadiene block copolymer. The reaction is conducted in such a way that the reaction mixture finally obtained contains butadiene. The living chains are treated with a terminating (quenching) agent, and the excess of monomeric butadiene is then removed. Styrene is then added, followed by free-radical polymerization. Even this process is not cost-effective, since it requires the removal of excess butadiene in a separate step, so as not to impair the styrene polymerization.

In summary, it can be said that all of the processes described hitherto for preparing impact-modified styrene either have additional steps for removing solvent or residual monomers from the rubber synthesis or are dependent on prior isolation of the rubber. Overall, purely anionic preparation of impact-modified styrene on an industrial scale is a problem which remains unsolved.

It is an object of the present invention to put forward a cost-effective process for the purely anionic preparation of impact-modified styrene (HIPS) which avoids the disadvantages of known processes and does not require intermediate isolation of the rubber from its solution. A further object is to put forward an anionic polymerization process which to a substantial extent can be utilized in plants which already exist for the free-radical preparation of impact-modified polystyrene.

We have found that this object is achieved by means of a process which has at least one system of circulating solvent and, simply expressed, the significant feature that the rubber required is introduced to the styrene polymerization plant in the form of a solution in a third solvent which is neither styrene nor ethyl-benzene and whose boiling point is lower than that of styrene, and that of ethylbenzene if present, and that at least some of this third solvent is reintroduced after being removed from at least one of the polymerization reactors, by means of distillation. It is advantageous here for at least some of the heat of vaporization required as a result of evaporative cooling to be supplied via the heat of polymerization.

A second system of circulating solvent results from the devolatilizing, in a manner known per se, of the polymer formed, i.e. the impact-modified polystyrene, i.e. from the removal of any remaining monomer residues and the associated solvent (usually entrained ethylbenzene and toluene, and also residues of the third solvent according to the invention) and the condensing of the vapor stream produced and, if worthwhile, its reintroduction into the plant, directly or after appropriate recovery procedures.

The invention primarily provides a process of the type mentioned at the outset, in which according to the invention at least one system of circulating solvent is provided, where the rubber is used in the form of a solution in a third solvent which is neither styrene nor any alkylaromatic solvent used and whose boiling point is lower than that of styrene and that of any alkylaromatic solvent used and where, in a (first) system of circulating solvent, the third solvent is removed from at least one of the polymerization reactors by distillation with evaporative cooling and utilizing the heat of polymerization and, if desired after appropriate recovery procedures, i.e. directly or indirectly, is introduced into the rubber preparation process which is immediately upstream, and where, in a manner known per se, the impact-modified polystyrene formed is freed from residual styrene and, where appropriate, from minor components, and the vapor stream formed is condensed and, if desired in a second system of circulating solvent, again after appropriate recovery procedures if required, is likewise reintroduced. The alkylaromatic solvent used is preferably ethylbenzene.

As is known, the rubber which can be used according to the invention must be one which is intrinsically compatible with polystyrene in the manner which is typical of particulate graft rubbers, since no grafting occurs in the anionic polymerization. It may be an SB rubber (styrene/butadiene rubber), a styrene-butadiene block rubber or a mixture of styrene-free or low-styrene butadiene rubber and a styrene-butadiene block rubber prepared batchwise or preferably likewise prepared in a continuous process.

The third solvent according to the invention may be an aliphatic, cycloaliphatic or aromatic hydrocarbon having from 4 to about 8 carbon atoms, or mixtures of these with a boiling point (b.p.$_{1013hP}$) of below 130° C. Examples of suitable solvents are pentane, hexane, heptane, cyclohexane, methylcyclohexane, benzene and toluene. It is important that this third solvent fulfills the usual conditions for use in anionic polymerization, in particular freedom from protic substances and oxygen. It is expedient for it to be distilled before use and dried over alumina or molecular sieve.

BRIEF DESCRIPTION OF THE DRAWINGS

The drawing schematically illustrates a suitable apparatus for carrying out the inventive process The plant for preparing the rubber is also referred to below as reaction zone 1, while the first reactor, generally a stirred reactor, and if desired a further reactor, likewise a stirred reactor, are termed reaction zone 2. Further reactor(s) known from free-radical polymerization, e.g. tower reactors with plug flow for completing conversion, would count as a reaction zone 3. Reaction zone 4 is the part of the plant usually present in styrene polymerization plants for devolatilizing and obtaining the polymer.

Styrene is introduced into the first vessel of reaction zone 2 in at least the amount necessary to achieve phase inversion when polymerization is complete. The monomer/solvent mixture evaporating as a result of the heat of polymerization liberated is introduced to a rectification column allocated to the vessel and having a reflux condenser. If exceptionally in an individual case the heat of polymerization is insufficient to evaporate the desired amount of solvent, additional heating may be provided for the reactor and/or the feeds. The solvent is drawn off as overhead product from the rectification column and introduced into the preparation of the rubber, while the bottom product is reintroduced into the reactor. It is possible, in cases where a second reactor is provided and is likewise a stirred reactor, to separate a solvent off at that point also and, if desired, to introduce the resultant vapors to a single column, and to reintroduce the bottom product either into the first reactor or directly into the preparation of the rubber.

Figure 1:
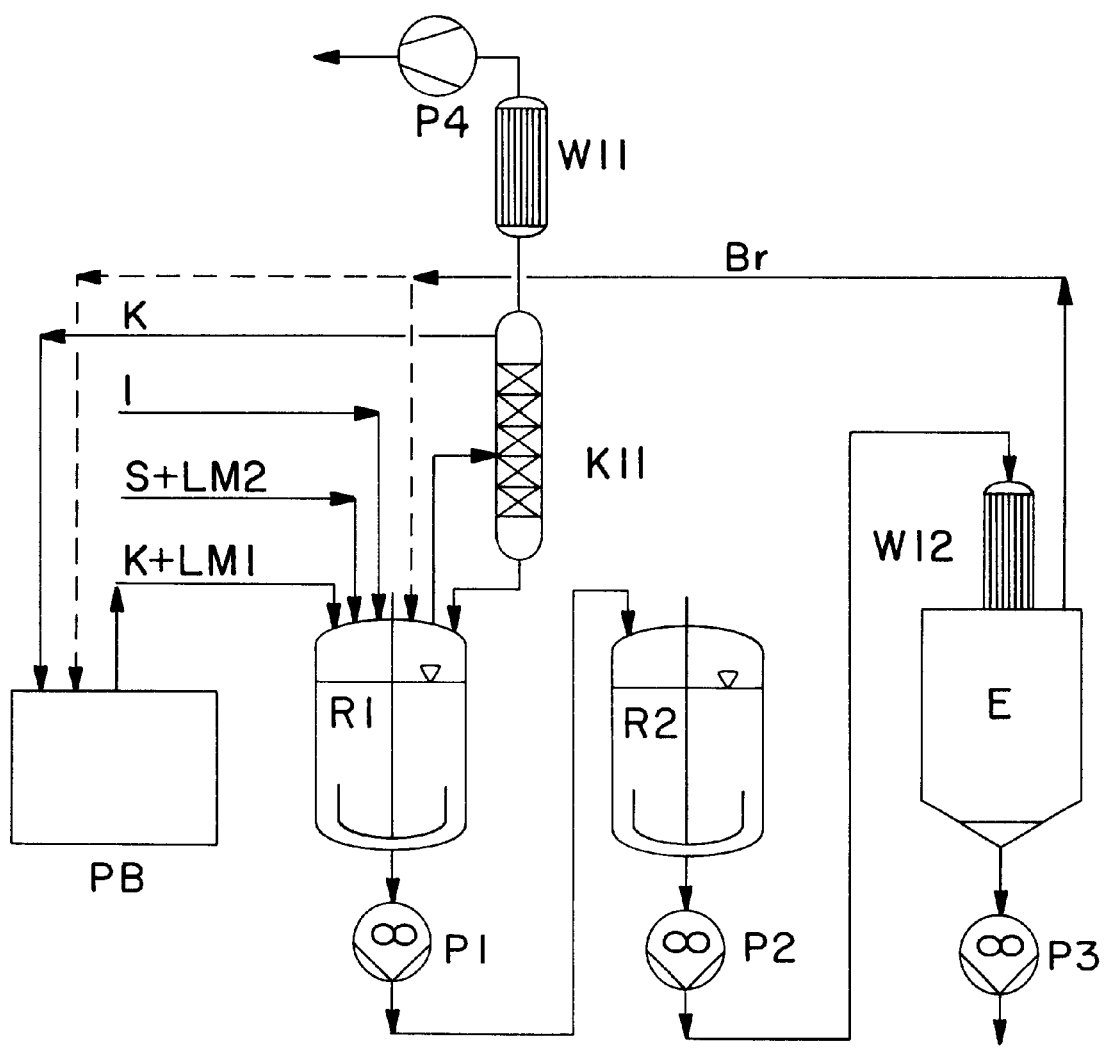

References above to styrene and butadiene are intended to include the respective customary technical equivalents. Styrene may, for example, be represented by 2-, 3- or 4-methylstyrene, tert-butylstyrene, ethylstyrene or α-methylstyrene or other substitution products of styrene with similar polymerization behavior (vinylaromatic compounds). Suitable monomers for preparing the rubber (other than styrene and butadiene) are other dienes or combinations of dienes and vinylaromatic compounds. Examples of other dienes are isoprene, dimethylbutadiene, 1,3-pentadiene and 1,3-hexadiene.

The novel process is expediently carried out in such a way that, for preparing the rubber, use is made of at least one solvent which has a boiling point of, in each case at atmospheric pressure, less than 130° C., preferably less than 120° C., and for preparation of the HIPS, if desired, use is made of a solvent which has a boiling point of above, respectively, 120 or 130° C. It is particularly advantageous to use toluene for synthesizing the rubber. In this case, it is expedient to remove only some of the toluene during the styrene polymerization. The residue remaining is removed during devolatilization and, depending on the compositon of the vapors, may be introduced either to the preparation of the rubber or else to the styrene polymerization.

When evaporative cooling is used according to the invention, the temperature which develops in reaction zone 2 corresponds to the boiling point of the mixture of monomer and low-boiling third solvent. It is, of course, also possible to carry out the process at a pressure other than atmospheric pressure, e.g. at reduced or at superatmospheric pressure. The pressure range from 0.1 to 5 bar is, for example, suitable. The relative boiling behavior of the solvents, which is important here, is generally not affected by this to any great extent.

In the HIPS preparation, a small amount is usually present of an aromatic solvent which is conventionally used for styrene polymerization and which is not completely removed during the preparation of the styrene. It therefore usually accumulates until it constitutes a certain proportion of the reaction mixture. These solvents are alkylbenzenes of appropriate boiling point, such as xylenes (b.p.$_{1013hP}$: ≈140° C.), and in particular ethylbenzene (b.P.$_{1013hP}$: 136° C.). To prevent their reaching an undesirably high level, it can be useful to draw off a portion of these alkylbenzenes by continually removing an aliquot of the solvent from the circulating system and introducing it to a recovery procedure. Small amounts of solvent residues of this type may also be introduced to a heating system or the like, if this proves to be cost-effective.

If the available styrene contains no ethylbenzene, it is not necessary to add ethylbenzene, since it can be replaced by the third solvent according to the invention. Depending on the conversion intended and on the solution viscosity which can be handled, the unconverted styrene can play a part in the evaporative cooling according to the invention.

The second reaction zone, in which according to the invention at least partial conversion takes place, may be a back-mixing unit throughout (a unit behaving as a stirred vessel), and according to the invention has a stirred reactor to which is allocated a column with a heat exchanger in which the constituents evaporated in the reactor are fractionated, the higher-boiling fraction being reintroduced into the second reaction zone and the lower-boiling fraction introduced into the preparation of the rubber, i.e. into the first reaction zone. According to the invention, the second reaction zone may also consist of more than one stirred vessel and columns allocated thereto. The overhead product may be introduced into the next reactor upstream in each case.

According to the invention, therefore, the solvent(s), and also some of the unconverted styrene which is still present in every case, are distilled off together in the second reaction zone, but are fractionated and reused, in each case at the relevant point in the course of the process.

The weight of styrene added is generally at least three times the weight of the rubber, i.e. of the block copolymer. The mixture is subjected to anionic polymerization in a manner known per se, if desired in the presence of additives which reduce the rate of reaction, for example organomagnesium or organoaluminum compounds. According to the invention, the heat of polymerization is substantially dissipated by evaporative cooling, in such a way that the polymerization temperature which develops corresponds to the composition of the volatile constituents of the reaction mixture and is, for example, from 70 to 180° C., depending on the prevailing pressure, which may, for example, be from 0.1 to 10 bar. A desirable conversion, depending on the proportion of solvent and on the polymerization process, is generally from 70 to 100%. Polymerization is preferably carried out to a conversion of 95% or above, and to virtually complete conversion if this is permitted by the apparatus used. To this end, the reaction mixture obtained from the last stirred reactor is polymerized in at least one further reactor to the desired conversion. These reactors may be the tower reactors known from styrene polymerization, which can be regarded as reactors with some degree of plug flow. Other reactors which are likewise suitable are simple tubular reactors or circulating reactors which are completely filled (i.e. operated without a gas space). The polymerization temperature here is, for example, from 80 to 200° C.

The monomers which are still unconverted at the end of the second reaction zone and the solvent which is still present can be removed in a system of circulating solvent which corresponds to the first circulating system. However, they usually accompany the product into the third reaction zone, where further styrene is consumed by polymerization and only a small amount of solvent and/or of third solvent, and possibly some styrene, are finally removed from the polymer by devolatilization in the usual manner, and advantageously reintroduced into the second reaction zone. It can be useful to divide up the vapors and to introduce the constituents into different upstream parts of the plant, for example to introduce the solvent into preparation of the rubber.

The average residence time in the individual reactors is, for example, from 0.1 to 3 hours, advantageously from 0.2 to 2 hours, if use is made of an initiator system which operates sufficiently slowly. The residence time may also be markedly smaller for polymerization exclusively with lithium alkylene.

The process is described in detail in the attached diagram.

The first reaction zone is indicated only schematically, since according to the invention it is constructed substantially following the prior art.

The second reaction zone essentially consists of a stirred reactor R1 and a rectification column K11 with a downstream condenser (heat exchanger) W11.

In the second reaction zone, at least one styrene monomer is polymerized as far as phase inversion in the presence of the rubber introduced from the first reaction zone, or of its solution in the third solvent, and, if desired, of a small amount of a high-boiling aromatic solvent (e.g. ethylbenzene). This reaction zone therefore serves to set the desired particle morphology of the rubber (cf. Echte, loc. cit.).

The heat exchanger W11 and the column K11 mentioned serve to fractionate and condense the vapors. The column K11 is to be dimensioned and operated in such a way that it brings about condensation of most of the unreacted styrene and of any high-boiling aromatic solvent which may be present, and these are directly reintroduced into this second reaction zone (specifically to the reactor R1), whereas the low-boiling solvent and, if desired, possibly some of the styrene, remain in vapor form and are introduced into the heat exchanger W11 to be condensed; the column K11 is therefore a component which should have some fractionating action, usually achieved, for example, by means of internal structures, packing or simply appropriate length. The amount of styrene in the low-boiling solvent may be up to 70% by weight, preferably up to 50% by weight, based on the total amount of the rubber used.

The low-boiling solvent is then substantially separated out by condensation in W11 and, as is expedient in many cases, then collected in a tank, from where it is reintroduced into the rubber synthesis after appropriate retreatment (purification and drying). Small amounts of low-boiling solvent may remain in the reaction mixture of the second reaction zone, i.e. they may be tolerated in consideration of the subsequent devolatilization zone. The material discharged from the second reaction zone is generally polymerized to completion in a further, third reaction zone, before it is finally freed from low-molecular-weight constituents (devolatilized) inma suitable surface evaporator (devolatilizer E). The third reaction zone consists of at least one reactor with predominantly plug flow (T1 in the diagram), in which it is possible to achieve virtually complete styrene conversion. Examples of possible reactors are stirred tower reactors or hydraulically filled tubular reactors.

The advantage of the novel process is that it is possible to produce impact-modified molding compositions without the need for a separate step to free the required rubber from its solvent.

A further advantage is the possibility, at relatively low cost, of converting existing plants in which the required rubber has hitherto had to be dissolved in styrene, i.e. to introduce a rubber production step upstream and thus considerably improve the cost-effectiveness of the plants.

The preparation of impact-modified polystyrene is described in more detail below using the diagram. The rubber is prepared continuously or batchwise, using prior art methods.

Rubber solution (line K+LM$_1$) from the upstream plant PB and initiator solution (line I) are added in a stirred reactor R1 to styrene, which may, if desired, contain a certain amount of toluene and/or of ethylbenzene (line S+LM$_2$), and are polymerized at from 60 to 220° C., preferably from 70 to 180° C. If the temperature to be maintained is to be below the boiling point of the solvent (b.p.$_{1013hp}$) it may be necessary to operate at subatmospheric pressure in order to achieve sufficient cooling (vacuum pump P4). Otherwise, a suitable pressure is atmospheric or superatmospheric pressure, adjusted in accordance with the boiling points of styrene and/or solvent and the highest intended polymerization temperature.

The amount of styrene added should be at least three times the weight of the rubber. The conversion in the stirred reactor R1 is selected in such a way that phase inversion takes place in this reaction zone; it is known that this results in formation of rubber particles dispersed in the polystyrene matrix. It is possible to set the desired size and structure of the rubber particles by means of a suitable selection of shear conditions (cf. Echte, loc. cit.).

The third solvent, which is fractionated in the superposed column (evaporative condenser) K11 and separated out by condensation in the heat exchanger W11, is reintroduced (line K) into the rubber synthesis. Purification and drying, e.g. by passage over alumina or molecular sieve, may be interposed if necessary.

The reaction mixture present in the stirred reactor R1 is drawn off continuously (pump P1) and polymerized in a further stirred reactor R2 as far as the desired conversion, giving the desired thermoplastic molding composition in the form of a (concentrated) solution similar to a melt. If relatively high viscosity is likely, it can be useful, instead of the stirred reactor, to use a hydraulically filled circulating reactor, a tower reactor or a tubular reactor with static internal structures: success can be achieved irrespective of whether the reactor R2 operates with back-mixing or provides plug flow or has mixing characteristics intermediate between these. The heat of reaction arising in R2, if this is a stirred reactor, can of course likewise be dissipated by evaporative cooling. This can be useful in particular if a further diminution in the amount of low-boiling solvent is to be achieved. Suitable technical solutions are generally any of those which have been introduced in industry for the conventional free-radical polymerization of styrene (e.g. tower reactors with internal cooling elements which protrude between the arms of the stirrer; cooling jackets). If R2 is a back-mixing reactor, then, as stated above, if complete conversion is to be achieved there must be a subsequent reaction zone with plug flow to bring this about. The living chain ends of the thread-like molecules produced are finally destroyed in a known manner by adding a terminating agent in a downstream mixer.

This polymer solution which is finally obtained is drawn off (pump P2) and devolatilized in a conventional apparatus (extruder or reduced-pressure apparatus E, as usually used for devolatilizing polymers) at from 190 to 320° C. The vapors drawn off (Br in the diagram) essentially consist of unconverted styrene and the aromatic solvent, preferably virtually exclusively of solvent. It is expedient for the vapors to be condensed and they may, for example, be introduced directly into the reactor R1.

For the purposes of the invention, the rubber is at least one styrene-butadiene block copolymer, having, for example, linear or star-shaped structure with random or ordered block structure and with sharp or tapered block transitions. Examples of suitable polymers are block copolymers of types $(AB)_n$, A—B—A, B—A—B or $(A-B)_m X$, $(B-A)_m X$, $(A-B-A)_m X$ or $(B-A-)_m X$, where X is the radical of a multifunctional coupling agent and A is a styrene block and B a block made from a diene; n is an integer from 1 to 6 and m is an integer from 2 to 10. It is also possible to make concomitant use of pure polydienes, as long as these are produced in the same process together with the block copolymer. It is preferable to use mixtures of low-styrene or styrene-free polydienes and block copolymers. The ratio of the two rubbers has an effect on the particle size and particle structure achieved.

Block A and/or block B may contain butadiene and styrene in random distribution. Preferred block copolymers are those made from styrene, α-methylstyrene, butadiene and isoprene. The glass transition temperatures of the diene-containing segments (blocks) of the rubbers produced should be below −20° C., in particular below −40° C.

A mono-or multifunctional alkali metal alkyl compound or a mono- or multifunctional alkali metal aryl compound may be used to initiate the polymerization. For known reasons, use is primarily made of organo-lithium compounds. Examples which may be mentioned are ethyllithium, propyllithium, isopropyllithium, n-butyllithium, sec-butyllithium, tert-butyllithium, phenyllithium, hexyldiphenyllithium, hexamethylenedilithium, and also butadienyl-lithium and isoprenyldilithium. The amount added depends on the molecular weight desired, but is generally in the range from 0.002 to 5 mol %, based on the monomers.

Concomitant use may be made of alkylmagnesium compounds or alkylaluminum compounds, or of derivatives and mixtures of these, in order to lower the reaction rate and/or to improve the thermal stability of the polymerization products.

Suitable compounds for destroying the living chain ends after the polymerization has been completed are protic substances or Lewis acids, such as water, alcohols, aliphatic or aromatic carboxylic acids, and also weak mineral acids, e.g. carbonic acid or boric acid.

Suitable monomers other than styrene for preparing the impact-modified thermoplastic molding compositions are, as stated at the outset, other vinylaromatic compounds. It is possible, for example, for α-methylstyrene, tert-butylstyrene, vinyltoluene, p-methylstyrene, and also mixtures of the compounds mentioned, to be used instead of styrene.

Auxiliaries which may be added, generally after completion of the polymerization, are lubricants, stabilizers, regulators or mold-release agents.

EXAMPLES

The polymerization Plant (cf. diagram)

Reaction area R1 is a stirred reactor holding 30 liters and equipped with an anchor stirrer and a superposed column K11 and a descending condenser W11, as shown in the diagram. The reaction mixture can be discharged from R1 using a gear pump P1 and conveyed into the reactor R2. Into R1 are metered a rubber solution, the solvent LM2, if desired the vapors arising during devolatilization (vapor line Br), the required amount of monomer (St) and initiator.

Like R1, R2 is equipped with an anchor stirrer, and it has a volume of 50 liters. If desired, R2 may be operated with evaporative cooling (using a column not shown in the drawing) or with jacket cooling. Downstream there is a gear pump P2, which can discharge the reaction mixture in a usual manner and can introduce it into a devolatilizing apparatus E. A tube-bundle heat exchanger serves for devolatilization and is located upon a vessel which can be evacuated. If complete conversion of the styrene is to be achieved, use may be made if desired of a tower reactor T1 (not included in the drawing) which is downstream of R2 and has a capacity of 40 l. Immediately after P2, or T1 as appropriate, the terminating agent is incorporated homogeneously using a mixing section (not included in the drawing) of length 540 mm and provided with a DN32 SMXL mixer (manufacturer: Sulzer, Winterthur, Switzerland). A further gear pump P3 is provided after E for discharge of the product, followed by a die plate and pelletizing apparatus.

Tests:

Notched impact strength in accordance with DIN 53453 on notched standard specimens. Yield stress in accordance with DIN 53 455 on specimens in accordance with ISO 3167.

Example 1

The following raw materials were prepared:

freshly distilled anhydrous technical styrene monomer with 800 ppm ethylbenzene content;

sec-butyllithium, 1.6 molar in n-hexane/cyclohexane (volume ratio 1:9) diluted in a weight ratio of 1:4 with toluene.

triisobutylaluminum, 6% strength by weight in toluene mixture of 10% by weight of methanol and 90% by weight of toluene for terminating the polymerization (removal of the living chain ends).

The amounts per hour metered in continuously to the stirred reactor R1 were 7.4 kg of styrene, 4.8 kg of a solution preheated to 90° C. and composed of 0.8 kg of a styrene-butadiene block copolymer of molar mass 220,000 g/mol and having a proportion of 25% by weight of styrene, 4 kg of toluene and also initiator. The initiator used was 95 g/h of sec-butyllithium solution and 125 g/h of the triisobutylaluminum solution. The pressure in the stirred reactor was set in such a way that the temperature of the mixture was 105° C. 2.2 kg per hour of a mixture of 91% by weight of toluene and 9% by weight of styrene were drawn off via K11. The steady-state reaction mixture had a solids content of 30% by weight; it was transferred into the stirred reactor R2 and polymerized at 110° C. to a solids content of 55% by weight, and then to complete conversion at 150° C. in T1. Via the mixer, 200 g/h of methanol-toluene mixture were added to the discharged product, followed by heating to 250° C. in the heat exchanger W21 and, to remove volatile constituents, transferred with release of pressure into an evacuated vessel. 5% by weight of the condensed vapors were removed from the circulating system to prevent a rise in the level of the ethylbenzene carried along with them. The melt was discharged using a gear pump, and pelletized. A notched impact strength of 6.1 kJ/m$^2$ and a yield stress of 32 MPa were measured.

Example 2

The amounts per hour metered continuously into the stirred reactor R1 were 7.4 kg of styrene, 4.8 kg of a solution heated to 60° C. comprising 0.8 kg of a styrene-butadiene block copolymer having a molar mass of 228,000 g/mol and a proportion of 25% by weight of styrene, 4 kg of cyclohexane, all of the recirculated vapors (2.2 kg/h of ethylbenzene, besides small amounts of other hydrocarbons), and also initiator. The initiator was 95 g/h of the sec-butyllithium solution and 125 g/h of the triisobutylaluminum solution from Example 1. The size of the reactor and the resultant residence time gave a steady-state solids content of 31% by weight. The pressure in the stirred reactor was adjusted in such a way that the temperature established was 105° C., with boiling. 4.1 kg/h of solvent vapor were drawn off from the column as overhead product and introduced to the rubber preparation. Besides cyclohexane, small amounts of toluene were also present in the vapor. The reaction mixture was discharged into the stirred reactor R2, where polymerization took place at 110° C. to a solids content of 55% by weight. Polymerization was carried out to complete conversion at 150° C. in the tower reactor. 200 g/h of methanol-ethylbenzene mixture were added to the discharged product, followed by heating to 250° C. and release of pressure. 5% by weight of the condensed vapors were removed from the system. The melt was discharged via a gear pump, and pelletized. The notched impact strength was 6.8 kJ/m$^2$ and the yield stress was 31 MPa.

We claim:

1. A continuous process for preparing impact-modified vinylaromatic polymers which comprise, a disperse rubber phase in a vinylaromatic polymer matrix, by anionic polymerization of a vinylaromatic compound in a polymerization reactor, or in more than one polymerization reactor arranged in sequence, in the presence of a rubber prepared in an immediately prior process, which comprises a) introducing the rubber in the form of a solution in a third solvent which has a boiling point lower than those of styrene and ethylbenzene, and providing at least one circulating system of solvent by utilizing the heat of polymerization to remove the third solvent from at least one of the polymerization reactors via distillation with evaporative cooling and, directly or indirectly, reintroducing the same into the rubber preparation process, and b) freeing the resultant impact-modified vinylaromatic polymer from any remaining vinylaromatic residues, by heat treatment under reduced pressure, and condensing the resultant stream of vapors, and, optionally reintroducing the same in a second circulating system of solvent.

2. A process as claimed in claim 1, wherein the third solvent used for preparing the rubber is an aliphatic, cycloaliphatic or aromatic hydrocarbon having from 4 to 8 carbon atoms or a mixture of such hydrocarbons having a boiling point at atmospheric pressure (b.p.$_{1013hP}$) below 130° C.

3. A process as claimed in claim 2, wherein the solvent used for the rubber preparation has a boiling point at atmospheric pressure (b.P.$_{1013hp}$) below 120° C.

4. A process as claimed in claim 1, which is carried out at a pressure other than atmospheric pressure.

5. A process as claimed in claim 1, wherein no use is made in the vinylaromatic polymerization of any other solvent which is not a vinylaromatic and which has a boiling point of above 130° C. at atmospheric pressure.

6. A process as claimed in claim 1, wherein the solvent of the second circulating system is also, at least to some extent, reintroduced into the upstream process for preparing the rubber.

7. A process as claimed in claim 1, wherein the rubber used is a styrene-butadiene block copolymer or a particulate polybutadiene rubber compatibilized by grafting with styrene.

8. A process as claimed in claim 1, wherein the first reactor is a stirred reactor and the monomer/solvent mixture which evaporates as a result of the heat of polymerization is introduced to a rectification column allocated to the reactor and having a reflux condenser.

9. A process as claimed in claim 8, wherein the rectification column is placed upon the reactor or is situated downstream.

10. A process as claimed in claim 8, wherein the solvent is drawn off from the rectification column as overhead product and introduced to the rubber preparation, and the bottom product is reintroduced into the reactor.

11. A process as claimed in claim 8, wherein there is provision of a second reactor which is likewise a stirred reactor and to which distillation equipment is allocated.

12. A process as claimed in claim 11, wherein in the second reactor unconverted vinylaromatic compound together optionally with the third solvent are distilled off, optionally fractionated, and used again at the respective relevant point in the course of the process.

13. A process as claimed in claim 8, wherein the reactor and/or any feeds thereto are additionally heated.

14. A process as claimed in claim 1, wherein, the vinylaromatic compound is tert-butylstyrene, ethylstyrene vinyltoluene, p-methylstyrene or α-methylstyrene.

15. A process as claimed in claim 1, wherein the rubber is prepared from butadiene, isoprene, dimethylbutadiene, 1,3-pentadiene or 1,3-hexadiene or combinations of these dienes and styrene, 4-methylstyrene, tert-butylstyrene, ethylstyrene or α-methylstyrene.

* * * * *